May 29, 1956  F. J. BENEDETTO  2,747,316
DECOY
Filed Aug. 17, 1953  3 Sheets-Sheet 1
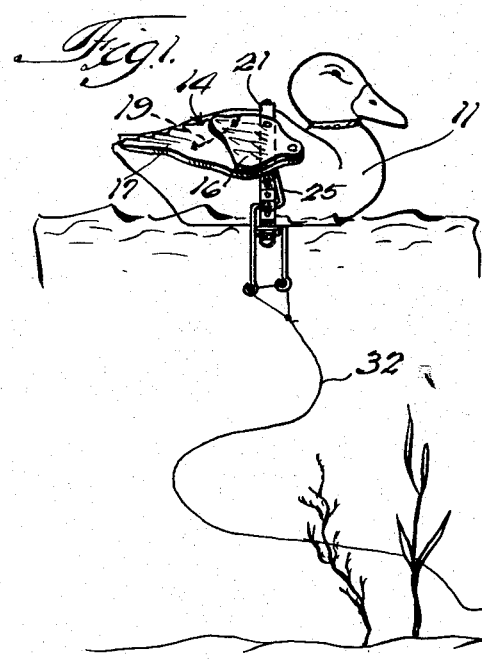
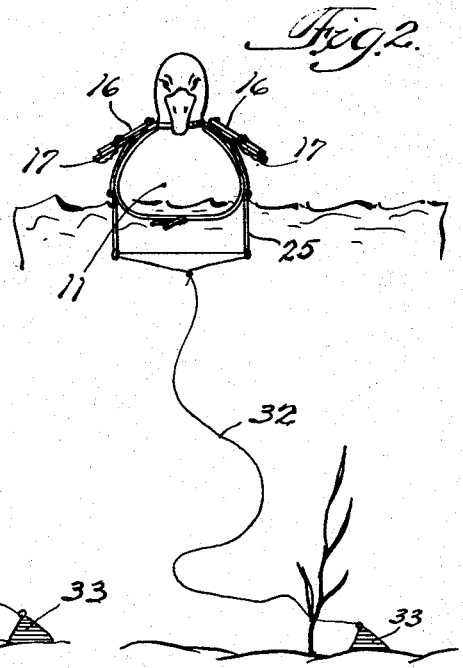
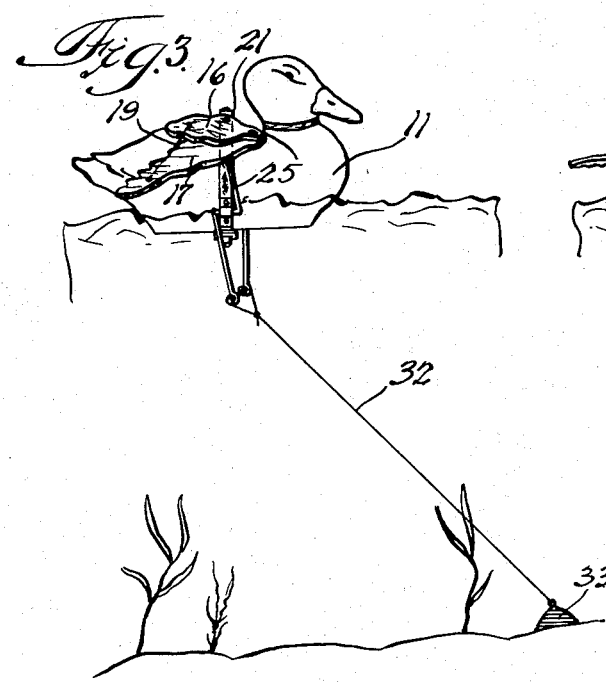
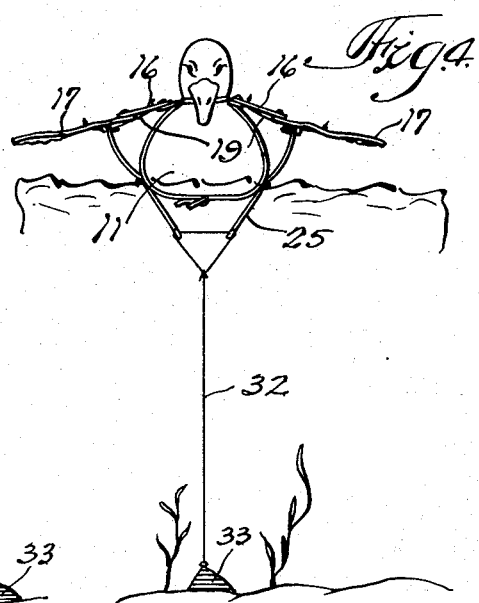
INVENTOR.
Frank J. Benedetto.
BY
Thiess, Olson, Mecklenburger,
von Holst, & Coltman.

May 29, 1956 F. J. BENEDETTO 2,747,316
DECOY
Filed Aug. 17, 1953 3 Sheets-Sheet 2
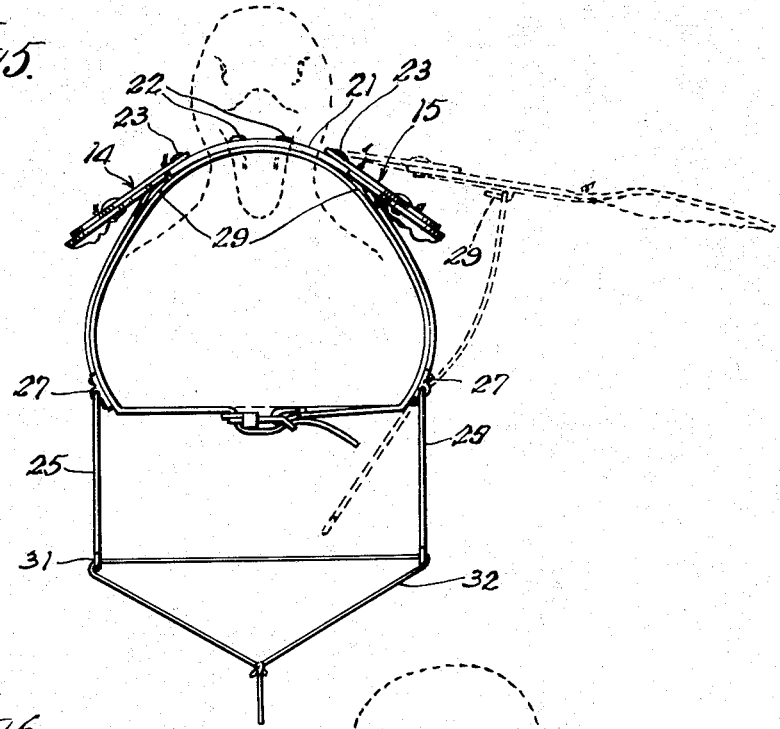
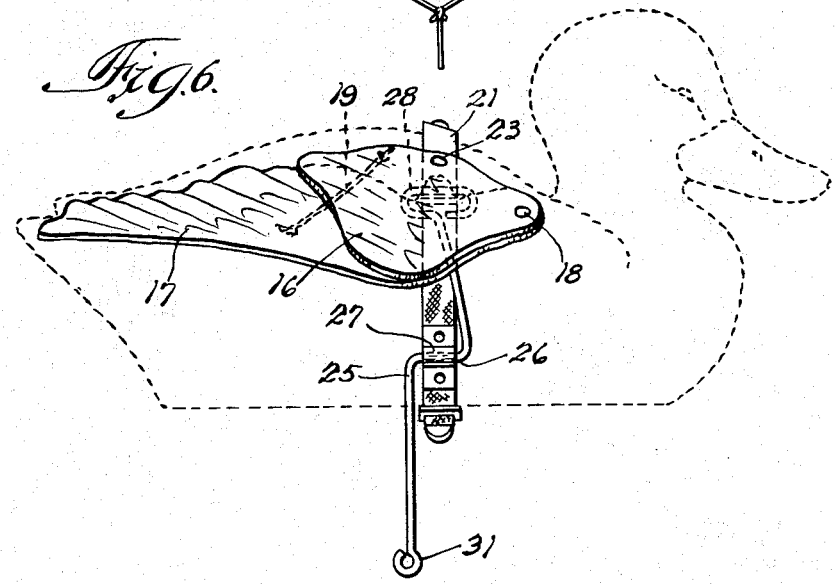
INVENTOR.
Frank J. Benedetto.
BY
Thiess, Olsen, Mecklenburger,
van Holst & Coltman. Attys.

May 29, 1956  F. J. BENEDETTO  2,747,316
DECOY
Filed Aug. 17, 1953  3 Sheets-Sheet 3
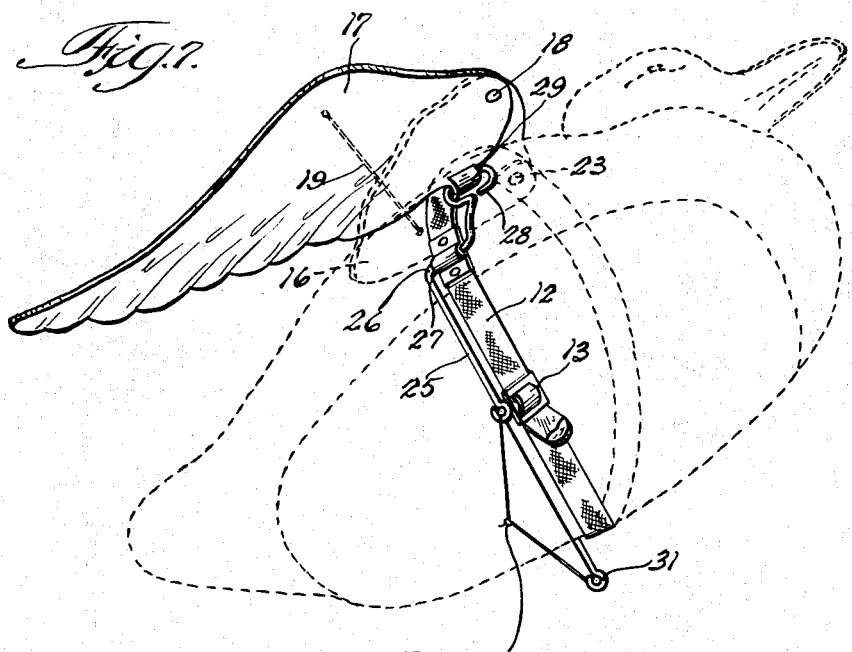
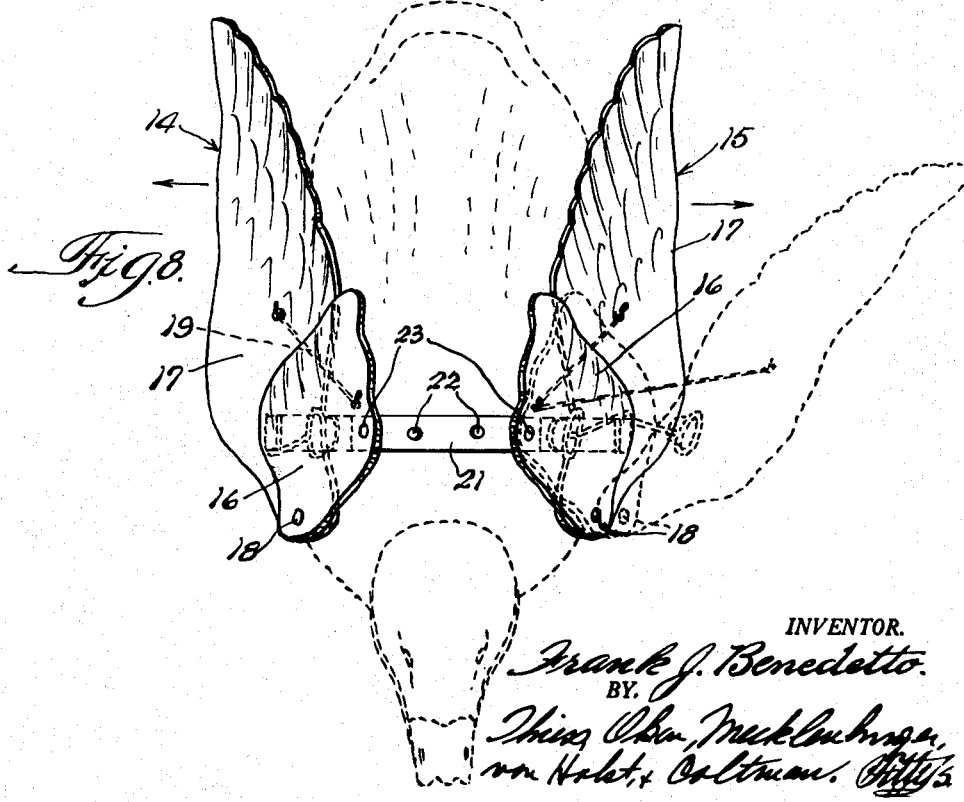
INVENTOR.
Frank J. Benedetto
BY

United States Patent Office 2,747,316
Patented May 29, 1956

2,747,316
DECOY

Frank J. Benedetto, Chicago, Ill.

Application August 17, 1953, Serial No. 374,691

12 Claims. (Cl. 43—3)

The present invention relates to decoys for wild water fowl such as ducks and geese and has special reference to decoys having extendable or flapping wings. More particularly, this invention relates to an extendable wing construction that may be readily and detachably secured to the usual inanimate decoy.

It has long been known that wild water fowl are more attracted to decoys having movement to attract their attention than to the common type of wood or plastic decoy. However, prior decoys of the animate or movable type generally had permanently attached, complicated mechanisms, usually located in the cavity of a specially constructed body to produce the desired movement.

The movable wing construction of the present invention has few parts and is durable and uncomplicated. Moreover, it is intended for use with common types of decoys now in use to which it may be readily attached or from which it may be easily and quickly removed when desired such as when being transported to and from its place of use or for storage purposes.

An object of the present invention is to provide a decoy wing construction which is movable.

Another object is to provide a movable wing construction for attachment to common types of decoys now in use.

A further object is to provide a movable wing construction which may be readily attached to and removed from a decoy.

Still another object is to provide a movable wing construction of the above type that is automatically actuated by the motion imparted to the decoy resulting from the waves of the water on which it floats.

A still further object is to provide such a wing construction that is of simple construction, relatively inexpensive, and may be employed on various types of decoys without requiring any modification of the decoys themselves.

Further objects and advantages will be apparent from the following description and claims when considered with the drawings, in which:

Figure 1 is a side elevational view of a decoy having thereon a wing construction embodying the present invention attached to an anchor line;

Fig. 2 is a front elevational view of the decoy and wing construction shown in Fig. 1;

Fig. 3 is a view similar to Fig. 1 but showing the wings in open or extended position due to the pull exerted by the anchor line;

Fig. 4 is a view similar to Fig. 2 but showing the wings in extended position due to the pull on the anchor line;

Fig. 5 is an enlarged view of the wing construction shown in Fig. 2 with the extended position of the wing indicated in dotted lines;

Fig. 6 is an enlarged side elevational view of the wing construction shown in Fig. 1, attached to a decoy shown in dotted lines;

Fig. 7 is a bottom perspective view of the wing construction with the wings in partially extended position, attached to a decoy shown in dotted lines; and Fig. 8 is a top plan view of the wing construction with the wings in the same position as in Fig. 7, attached to a decoy shown in dotted lines.

Referring more particularly to the drawings, there is shown an ordinary wood or plastic duck decoy 11 such as commonly used, having attached thereto a wing construction embodying the present invention. In order to permit the present wing construction to be attached to or removed from the decoy, it is mounted on a harness or strap 12 of sufficient length to pass transversely about a decoy as shown in the drawings. A buckle 13 is provided at one end of the strap so that the strap may be secured to the decoy with the buckle located at the bottom of the decoy.

A pair of wings 14 and 15 are movably connected to the strap 12 intermediate the ends thereof in such position that with the harness in place on the decoy the wings will be properly located on each side of the back of the decoy. Each of the wings in the form shown comprises an upper wing portion 16 and a lower wing portion 17. The wing portions 16 and 17 of each wing are arranged in generally superposed position and are pivotally connected at their forward ends by a suitable pivot member 18, thus permitting the wing portions to move from their normal superposed position, shown particularly in Figs. 1, 2, 5 and 6, to their open or extended position, illustrated in Figs. 3, 4 and 7 and by the dotted lines of Figs. 5 and 8.

In order to maintain the wings in their normal superposed position, a resilient member, such as a strip of rubber 19, connects the undersides of the two wing portions 16 and 17 of each pair.

The upper wing portions are movably attached to the strap 12 by means such as a strip of flexible material 21 secured intermediate its ends by rivets 22 to the portion of the strap 12 which will be on the back of the decoy. The outer ends of the flexible strip 21 are secured adjacent the inner edges of the upper wing portions by suitable connecting members such as rivets 23. This permits each of the wings to pivot more or less vertically on the strap 12. Other means than the flexible strip 21 may be employed to permit the desired movement of the wings on the strap 12.

A lever 25, shown most clearly in Fig. 6, is employed on each side of the decoy for providing the desired motion to the wings. Each of the levers 25 is provided with a transverse portion 26 intermediate its ends which pivots in a bracket 27 secured to the strap 12 on each side of the decoy when the wing construction is in proper position. The upper ends of the levers 25 terminate in loops 28 for engaging hooks or projections 29 preferably positioned at the inner edges of the lower wing portions 17. The opposite or lower end of each of the levers 25 is preferably provided with an eye 31 through which the end of an anchor line 32 may be looped as illustrated in the various figures. The lower end of the anchor line 32 is secured to any suitable anchor 33.

With this construction, whenever there is a pull on the anchor line 32, as illustrated in Figs. 3 and 4, the lower ends of the levers 25 are pivoted inwardly, forcing the upper ends of the levers outwardly into the position shown in Figs. 3 and 4. As the upper ends of the levers 25 engage the hooks 29 of the lower wing portions, the latter are moved outwardly into extended position and at the same time the wing portions 16 and 17 are moved upwardly as shown by the dotted line position in Fig. 5. As soon as tension on the anchor line is released, the resilient members 19 return the lower wing portions and the levers 25 to their normal position.

In the construction illustrated, each wing consists of only two wing portions. If desired for some purposes, additional wing portions could be employed, connected together by suitable resilient members. In referring herein to the normal superposed and extended positions of the wing portions 16 and 17, it is intended to cover constructions where, in normal position, a relatively greater portion of the upper and lower wing portions overlap than in their extended position.

The present wing construction is preferably arranged so that it may be readily attached to and detached from the decoy on which it is to be used. However, if desired, the same wing construction could be permanently mounted on the decoy with the various pivots and brackets attached directly to the decoy rather than to the strap or harness 12.

When a decoy embodying the present invention is floating on the surface of the water with an anchor line looped through the eyes 31 of the levers 25, a pull will be periodically exerted on the lower ends of the levers 25 as the decoy rises and falls and moves sideways due to the wave motion. The same effect could be produced by manually pulling on a line looped through the eyes on the levers. Whenever the tension is increased enough to pull the ends of the levers 25 toward each other, the wings will be moved to extended position. This motion is sufficient to attract ducks, geese and other wild fowl flying overhead and draw them into firing range where ordinary inanimate decoys would have no effect.

While a particular embodiment of this invention has been illustrated and described, it will be understood, of course, that the invention is not to be limited thereto since many modifications may be made and it is contemplated, therefore, by the appended claims to cover any such modifications as fall within the true spirit and scope of this invention.

I claim:

1. A decoy wing construction comprising a pair of wing portions in generally superposed relationship connected adjacent their forward ends for relative sideways pivotal movement, resilient means tending to maintain said wing portions in normal generally superposed relationship, means for movably connecting one of said wing portions to the back portion of a decoy, and wing portion actuating mechanism for being connected to an anchor line and having a portion thereof for cooperating with the other wing portion to move the same outwardly upon movement of said actuating mechanism.

2. A decoy wing construction comprising a pair of wing portions in generally superposed relationship connected adjacent their forward ends for relative sideways pivotal movement, resilient means tending to maintain said wing portions in normal generally superposed relationship, means for movably connecting the upper wing portion to the back portion of a decoy, and wing portion actuating mechanism for being connected to an anchor line and having a portion thereof for cooperating with the lower wing portion to move said lower wing portion outwardly upon movement of said actuating mechanism.

3. A decoy wing construction comprising a pair of wing portions in generally superposed relationship connected adjacent their forward ends for relative sideways pivotal movement, resilient means tending to maintain said wing portions in normal generally superposed relationship, means for movably connecting one of said wing portions to the back portion of a decoy, wing portion actuating mechanism for being connected to an anchor line and having a portion thereof for cooperating with the other wing portion to move the same outwardly upon movement of said actuating mechanism, and means for movably connecting said actuating mechanism to said decoy.

4. A decoy wing construction comprising a pair of wing portions in generally superposed relationship connected adjacent their forward ends for relative sideways pivotal movement, resilient means tending to maintain said wing portions in normal generally superposed relationship, means for movably connecting one of said wing portions to the back portion of a decoy, wing portion actuating mechanism for being connected to an anchor line and having a portion thereof cooperating with the other wing portion, and means for pivotally mounting said actuating mechanism intermediate its ends to a side of said decoy to move said other wing portion outwardly upon inner movement of the portion thereof connected to the anchor line.

5. A decoy wing construction comprising a pair of wing portions in generally superposed relationship connected adjacent their forward ends for relative sideways pivotal movement, resilient means tending to maintain said wing portions in normal generally superposed relationship, means for movably connecting the inner side of the upper wing portion to the back portion of a decoy, a wing portion actuating lever for being connected adjacent one end to an anchor line and having the opposite end cooperating with the lower wing portion, and means for pivotally mounting said actuating lever intermediate its ends to a side of said decoy to move said lower wing portion outwardly upon inner movement of the end of the actuating lever connected to the anchor line.

6. A decoy construction comprising a body in the form of a water fowl, a pair of wings, each of said wings including at least two portions in generally superposed relationship connected adjacent their forward ends for relative sideways pivotal movement, resilient means associated with said wing portions of each wing tending to maintain them in normal generally superposed relationship, means for movably connecting the inner sides of one of said wing portions of each of said wings to the back of said body, and actuating mechanisms positioned at opposite sides of said body for being connected adjacent their lower ends to an anchor line and having their upper ends connected to another wing portion of each of said wings to move said last wing portions outwardly upon movement of the lower ends of said actuating mechanisms toward each other.

7. A detachable wing construction for decoys comprising a harness for being secured transversely about the body of a decoy, a pair of wings, each of said wings comprising a plurality of wing portions in generally superposed relationship connected adjacent their forward ends for relative sideways pivotal movement, resilient means associated with said wing portions of each wing tending to maintain them in generally superposed relationship, means for movably connecting the inner sides of one of said wing portions of each of said wings to said harness, and an actuating mechanism for each of said wings movably mounted on said harness, said actuating mechanisms having one end connected to another wing portion of each of said wings and having their other ends for connection to an anchor line.

8. A detachable wing construction for decoys comprising a harness for being secured transversely about the body of a decoy, a pair of wings, each of said wings comprising a plurality of wing portions in generally superposed relationship connected adjacent their forward ends for relative sideways pivotal movement, resilient means associated with said wing portions tending to maintain them in generally superposed relationship, means for movably connecting the inner sides of one of said wing portions to the harness portion intended to be positioned on the back of the decoy, and an actuating mechanism for each of said wings movably mounted on harness portions intended to be positioned below said wings on the sides of said decoy, each actuating mechanism having one end connected to another wing portion of each of said wings and having the opposite end for connection to an anchor line.

9. A detachable wing construction for decoys comprising a harness for being secured transversely about the body of a decoy, a pair of wings, each of said wings comprising a plurality of wing portions in generally superposed relationship connected adjacent their forward ends for relative sideways pivotal movement, resilient means associated with said wing portions of each of said wings tending to maintain them in generally superposed relationship, means for movably connecting the inner sides of the upper wing portion of each wing to the harness portion intended to be positioned on the back of the decoy, and an actuating mechanism for each of said wings movably mounted on the harness portions intended to be positioned below said wings on the sides of the decoy, each of said actuating mechanisms having one end connected to the lower wing portion of one of said wings and having the opposite end for connection to an anchor line.

10. A detachable wing construction for decoys comprising a harness for being secured transversely about the body of a decoy, a pair of wings, each of said wings comprising two wing portions in generally superposed relationship connected adjacent their forward ends for relative sideways pivotal movement, resilient means associated with said wing portions tending to maintain them in generally superposed relationship, means for movably connecting the inner sides of the upper wing portion of each wing to the harness portion intended to be positioned on the back of the decoy, and a lever for each of said wings pivotally mounted intermediate its ends on the harness portion intended to be positioned below said wings on the sides of the decoy, each of said levers having one end connected to the lower wing portion of one of said wings for moving the wing portion attached thereto and having the opposite end for connection to an anchor line.

11. A decoy wing construction comprising a wing portion having a pivot at the forward end thereof arranged to permit said wing portion to be pivoted about its forward end from an inner position substantially over the back of said decoy outwardly to the side thereof, yieldable means tending to maintain said wing portion in inner position, wing portion actuating mechanism for being connected to an anchor line and having a portion thereof for cooperating with said wing portion rearwardly of said pivot to effect movement of said wing portion upon movement of said actuating mechanism, and means for mounting said pivot adjacent the upper part of said decoy and said actuating mechanism on the outside of said decoy below said wing portion.

12. A decoy wing construction comprising a harness for being detachably secured to the outside of the body of a decoy, a wing portion, pivotal means for pivotally connecting the forward end of said wing portion to said harness to permit said wing portion to be pivoted about its forward end from an inner position substantially over the back of said decoy outwardly to the side thereof, yieldable means tending to maintain said wing portion in inner position, and wing portion actuating mechanism for being connected adjacent one end to an anchor line and having the opposite end for cooperating with said wing portion rearwardly of the forward end thereof to effect movement of said wing portion upon movement of said actuating mechanism.

References Cited in the file of this patent

UNITED STATES PATENTS

| | | |
|---|---|---|
| 74,458 | Wales | Feb. 11, 1868 |
| 378,410 | Trimble | Feb. 21, 1888 |
| 547,553 | Keller | Oct. 8, 1895 |
| 1,831,286 | Chelini | Nov. 10, 1931 |
| 2,413,418 | Rulison | Dec. 31, 1946 |